United States Patent [19]

Oikawa et al.

[11] 4,320,292
[45] Mar. 16, 1982

[54] COORDINATE INPUT APPARATUS

[75] Inventors: Shigeru Oikawa; Yuzo Katayama; Norio Takato; Takashi Kurokawa, all of Mito, Japan

[73] Assignee: Nippon Telegraph and Telephone Public Corporation, Tokyo, Japan

[21] Appl. No.: 154,407

[22] PCT Filed: Dec. 1, 1978

[86] PCT No.: PCT/JP78/00035
§ 371 Date: Aug. 22, 1979
§ 102(e) Date: Aug. 22, 1979

[87] PCT Pub. No.: WO79/00436
PCT Pub. Date: Jul. 12, 1979

[51] Int. Cl.³ .................. G06F 3/02; G06K 9/00
[52] U.S. Cl. ........................... 250/227; 250/221
[58] Field of Search .................. 250/227, 229, 221; 340/365 P, 707; 350/96.15

[56] References Cited

U.S. PATENT DOCUMENTS 4,113,353 9/1978 Matsushita .................. 250/227 X

Primary Examiner—David C. Nelms
Assistant Examiner—Darwin R. Hostetter
Attorney, Agent, or Firm—Charles E. Pfund

[57] ABSTRACT

A coordinate input apparatus. A pair of optical guide channel arrays each including a required number of parallel optical guide channels (11, 12) which contain optical scatterer (22) are superposed to form an input board (100) with the optical guide channels of the two arrays intersected at right angles. Light is detected which is scattered by the optical scatterer (22) in the optical guide channels (11, 12) corresponding to irradiation of one point on the input board by a light pen (10) and reaches end surfaces (11a, 12a) of the optical guide channels. The detected signals are processed to form a binary signal train representative of the coordinate of the light pen (10).

17 Claims, 18 Drawing Figures

COORDINATE INPUT APPARATUS

FIELD OF THE INVENTION

This invention relates to coordinate input apparatus utilized in various data processing systems, picture image information systems, and the like.

BACKGROUND OF THE INVENTION

Among prior art apparatus of the type described above, one may refer to, for example, an apparatus as disclosed in U.S. Pat. No. 3,868,681 wherein an electromagnetic or electrostatic coupling between an electrical conductor net extending over an input board and an input pen is detected to determine the coordinate position designated by the input pen on the input board, or an apparatus as disclosed in Bremner IEEE Transaction C, 1970, June, PP 546–548 wherein an input pen which radiates an ultrasonic wave which is received by microphones disposed about an input board so as to detect the delay of the wave received by the microphones from the position designated by the input pen, thus determining the coordinate position designated by the input pen. However, they are not yet satisfactory from the standpoint of construction and performance.

More particularly, in the former, high accuracy is required for the electrical conductor net on the input board and the peripheral circuit also requires high degree of skill. In the latter, since the propagating velocity of the ultrasonic wave varies with ambient temperature and humidity, it is necessary to compensate for the variation in the velocity. Furthermore, in order to detect a small delay of the received wave, it is necessary to use complicated peripheral circuits, thus making it difficult to decrease the cost of manufacturing and to attain high reliability. Especially, in the latter, it is necessary to constantly supply to the input pen a signal necessary for radiating the ultrasonic wave through an electric cord. Thus, it has been impossible to drive the input pen by a self-contained battery, for example, which dispenses with the cord (cordless) for connection between the input pen and the apparatus.

DISCLOSURE OF THE INVENTION

Accordingly, it is an object of this invention to provide an improved coordinate input apparatus having a high reliability which can not only obviate the disadvantages described above but also eliminate the cord.

Another object of this invention is to provide a coordinate input apparatus having simple construction, high reliability and high resolution.

Still another object of this invention is to provide a tapered structure fiber optic sheet which is used as a connector between the output end of a fiber optic sheet and a photo detector array for accurately connecting the output of the fiber optic sheet to the photo detector array.

A further object of this invention is to provide improved optical coupling means for coupling the output end of the tapered structure fiber optic sheet to the photo detector array.

Still further object of this invention is to provide an electronic circuit suitable for deriving out, as a binary signal train, the coordinate position of the input light pen by utilizing the output detected by the photo detector array.

According to one aspect of this invention, there is provided a coordinate input apparatus comprising an input board including two optical guide channel arrays superposed one upon the other with the optical guide channels of one array intersected at right angles with the optical guide channels of the other array, each array having a plurality of parallelly disposed optical guide channels, each channel containing optical scatterer; a light pen adapted to project a light beam upon the input board; photo detectors disposed to oppose one end surface of the respective optical guide channels for detecting scattered light of the projected light beam which propagates through the optical guide channels to convert the detected light into electrical signals; and an electronic circuit responsive to the electrical signals for producing a binary signal train which determines a coordinate position where the light beam is projected by the light pen.

According to another aspect of this invention, there is provided a coordinate input apparatus comprising a first fiber optic sheet including a plurality of parallelly disposed straight optical guide channels, each containing a minute optical scatterer; a second fiber optic sheet having the same construction as said first fiber optic sheet and superposed thereon with the optical guide channels of the first and second sheets intersected; tapered structure fiber optic sheets disposed at the end surfaces of said first and second fiber optic sheets, each tapered structure fiber optic sheet including tapered optical guide channels with a reduced spacing therebetween; photo detector element arrays each including a plurality of photo detector elements disposed to oppose said optical guide channels having reduced spacing of said tapered structure fiber optic sheets; a light pen for projecting a focused light beam onto the optical guide channels of said first and second fiber optic sheets; and a signal generator responsive to the outputs of said photo detector arrays for producing an electrical signal corresponding to a coordinate position on which said light beam is projected from said light pen.

BEST MODES OF THE INVENTION

The invention will now be described in detail with reference to the accompanying drawings.

Figure 1:
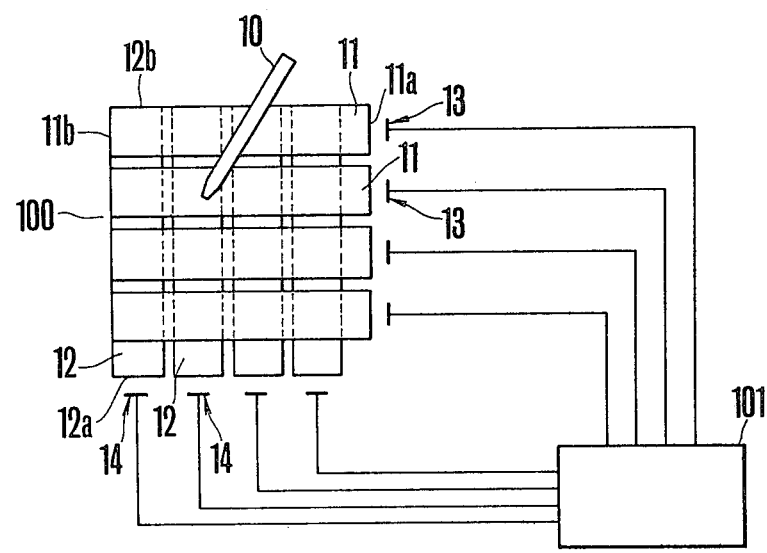
FIG. 1 is a diagrammatic representation showing the basic construction of the coordinate input apparatus embodying the invention.

FIG. 1 shows the basic construction of the coordinate input apparatus of this invention which comprises a light pen 10, and optical guide channels 11 and 12 arranged in parallel and containing optical scatterer. The optical guide channels 11 and 12 are superposed one upon the other to mutually intersect at right angles to thereby form a matrix-shaped input board 100. Photo detectors 13 and 14 are arranged to oppose end surfaces 11a and 12a of the optical guide channels 11 and 12, respectively. The light emitted by the light pen 10 is scattered by optical scatterer contained in the optical guide channels 11 and 12, and the scattered light propagates through these channels to reach the end surfaces 11a and 12a confronting the photo detectors 13 and 14 respectively.

The scattered light is detected by the photo detectors 13 and 14 so that it is possible to determine the coordinate position of the light pen 10 by identifying respective point of the matrix formed by the optical guide channels. Since the opposite end surfaces 11b, 12b and 11a, 12a of the optical guide channels 11 and 12 have the same cross-sectional configuration, the photo detectors 13 and 14 may also be disposed to oppose respective end surfaces 11b and 12b. In this manner, when the photo detectors are disposed on both ends of the optical guide channels, the dependency of the detected light signal upon the position of the light pen is decreased thereby simplifying the circuit construction.

As will be described later in detail, the signals (usually converted into electrical signals) generated at matrix points and detected by the photo detectors are processed by an electronic circuit 101 and the coordinate position designated by the light pen 10 is derived out as a binary signal.

Figure 2:
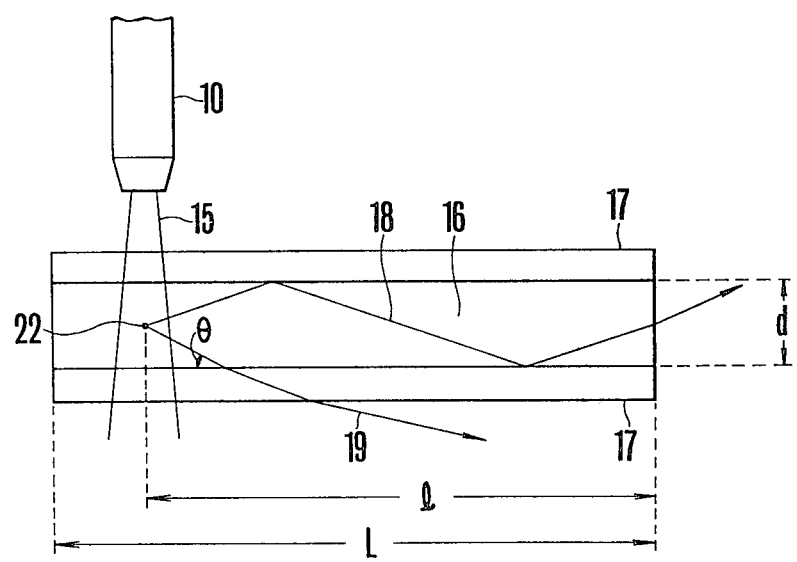
FIG. 2 is a diagram useful to explain the manner of propagation of scattered light through an optical guide channel of the apparatus shown in FIG. 1.

FIG. 2 is a diagram helpful to explain how the scattered light is formed in the cores 16 of the optical guide channels 11 and 12 by a focussed light beam 15 emitted by the light pen 10, and the manner of propagation of the scattered light through the cores 16. More particularly, the light beam 15 reaches the core 16 through a protective layer 17 acting as a cladding of the optical guide channel 11 and then enters into the rear side optical guide channel 12 through core 16 and rear side protective layer 17. But due to a minute scatterer 22, a portion of the incident light beam 15 is scattered in all directions.

Since the transmitting light attenuates exponentially, the energy scattered by the minute scatterer among the total energy of the incident light beam 15 is expressed by $$1 - e^{-kd}$$

where d represents the thickness of the core 16, k the absorption coefficient due to scattering in the light transmission path. In the same manner, the attenuation of propagating light 18 originating from the scattering by the minute scatterer 22 and propagating through the core 16 is expressed by $$e^{-kl}$$

where l represents the length of propagation.

Among the scattered light which is directed in all directions by the minute scatterer 22, only the light incident upon the protective layer at an incident angle $\theta$ smaller than $\theta_c$ can propagate through the core 16, whereas those incident upon the protective layer at an incident angle $\theta$ larger than $\theta_c$ transmits through the protective layer to the outside, thus forming a dispersing light 19. According to Snell's law, $$\sin\left(\frac{\pi}{2} - \theta_c\right) = \frac{n}{n_0} \tag{1}$$

where $n_0$ represents the refractive index of the core 16 and n that of the protective layer 17.

Furthermore, there is defined a relationship
$$R_{SP} = I/I_0 \tag{2}$$

where $I_0$ represents the total energy of the scatered light and I that of the light that can propagate through the core 16.

By combining equation (2) with equation (1), we obtain $$R_{SP} = \frac{\text{total solid angle within incident angle } \theta_c}{\text{total solid angle}} \tag{3}$$

$$= \frac{1}{4\pi} \int_0^{\theta_c} 2\sin\theta \cdot d\theta$$

$$= \frac{1}{2}(1 - \cos\theta_c) = \frac{1}{2}\left(1 - \frac{n}{n_0}\right)$$

$$= \frac{n_0 - n}{2n_0} = \frac{\Delta n}{2n_0}$$

When it is assumed that the intensity distribution of the scattered light is homogeneous, the excitation efficiency $\eta$ (scattered light energy/light pen output) of the propagating ray caused by the total incident light energy from the light pen 10 is expressed by an equation $$\eta = \frac{\Delta n}{2n_0}(1 - e^{-kd})e^{-kl} \tag{4}$$

Then, when the total length of the core 16 is denoted by L, $\eta$ becomes a minimum when L=l. To maximize the value of $\eta$, k must satisfy the following equation $$k = \frac{1}{d}\ln\frac{L+d}{L} \tag{5}$$

The optimum value $\eta_m(L)$ of the excitation efficiency can be determined from equation (5) as follows:

$$\eta_m(L) = \frac{\Delta n}{2n_0} \cdot \frac{d}{L+d} \left(\frac{L}{L+d}\right)^{\frac{L}{d}} \quad (6)$$

Where the resolution of the input board is made 100 um, that is, when the array pitch of the optical guide channel 11 or 12 is made 100 um, an optimum value of the thickness d is 100 um. Under these conditions, when the light path length L is made 20 cm, $\Delta n$ is made 0.1 and $n_0$ is made 1.6, $\eta(L) = 5 \times 10^{-6}$ results. Although it might be thought that this value is excessively small, an output of $5 \times 10^{-8}$ W would be obtained from the end surface of the optical guide channel if a semiconductor laser or a light emitting diode having an output of 10 mW were used as the light source of the light pen. Presently available self-scanning type photodiode array has a sensitivity (the amount of saturation exposure) of about $10^{-12}$ joule so that satisfactory measurement would be possible with a storage time of about 0.2 msec. Certain coordinate input apparatus has a resolution of 1 to 2 cm which is sufficiently high to be used as a Chinese character input apparatus. In this case, the thickness may be about 1 mm and the cladding may be substituted by air, in which case $\Delta n = 0.6$. Under these circumstances, the value of $\eta_m(L)$ becomes $3 \times 10^{-4}$. At this time, when a light source of about 10 mW is used, it is possible to obtain an output of about 3 $\mu$W, and such an output can be satisfactorily detected with a conventional photodiode.

One example of the method of preparing the optical guide channels 11 and 12 is as follows.

According to one method of preparing the optical guide channels of this invention which contain a scatterer, a fine powder of the scatterer is incorporated. Typically, a polystyrene or a polycarbonate is used as the base material and a fine powder of silica is incorporated into the base material. In this case, an advantageous particle size of the fine powder is several tens of angstroms while its amount of incorporation is $10^{-5}$ to $10^{-3}$, by weight. According to another method, a small amount of plastics having different index of refraction from that of the base material is incorporated into the base material. Generally, since different plastics do not fuse together, a mixture of two or more plastics looks thick in white. For example, when a small quantity of polymethyl methacrylate or polymethyl acrylate (having a refractive index of 1.49) is incorporated into polystyrene or polycarbonate (having a refractive index of 1.59) which acts as the base material, an optical guide channel containing a scatterer is obtained.

The scatterer which plays an important role in the optical guide channels of this invention should satisfy the following conditions.

(1) It must have different refractive index from the base material. In the example described above, the base material consisting of polystyrene or polycarbonate has a refractive index of 1.59 whereas that of a silica powder is 1.45.

(2) The particle size should be sufficiently small in order to produce Rayleigh scattering. The particle size should be less than 1/10 of the wavelength. If the particle size is too large, the intensity of the lateral scattering decreases.

(3) The concentration of the scatterer should be a suitable value. More particularly, the intensity of the scatterer light should decrease about 3 dB while it propagates through the optical guide channel. Where the length of the optical guide channel is 10 cm, the intensity decreases by about 30 dB/m. The intensity of the scattered light inherent to plastics used as the base material is smaller than this value by 3 to 4 orders of magnitude. In order to decrease the positional variation in the output (variation in the output according to the position of the matrix designated by the light pen), the concentration of the scatterer is decreased one order of magnitude as compared with a concentration which is responsible for the attenuation described above.

In one example of the core of the optical guide channel prepared under the conditions described above, a plate was manufactured by using a polystyrene which is a typical transparent plastic and utilized as the base material and incorporating it with 0.025% by weight of a fine powder of silica having a grain diameter of several tens of angstroms. A plate having a thickness of 1 mm, a width of 10 mm and a length of 200 mm was cut from the plate and the surface thereof was polished to an optical fineness. It looked slightly thick in white. The coupling efficiency of the plate to a light emitting diode which emits infrared rays was about $10^{-4}$ which was the same as an estimated optimum value. A polymer substance having a low refractive index, for example, a mixture of low refractive index epoxy resin (DER 732 sold by Dow Chemical Co. Ltd.) and a hardening agent sold under a trade mark TTA was coated on the opposite surfaces of the core to form the protective films.

Twenty optical guide channels 11 prepared as described above were arranged in parallel and photo detectors 13, phototransistors, for example, were disposed to confront respective end surfaces 11a of the channels with proper air gaps therebetween. (Where the width of the optical guide channel is 9.5 mm and the pitch thereof is 10 mm, a suitable gap dimension is 0.5 mm). The other group of optical guide channels 12 was also disposed similarly on the channels 11 at right angles, thus forming an input board 100. As a light source of the light pen was used a light emitting diode emitting infrared rays. With this construction, it is possible to identify the coordinate position of the light pen by means of ON-OFF states of the phototransistors with high accuracies.

Figure 3:
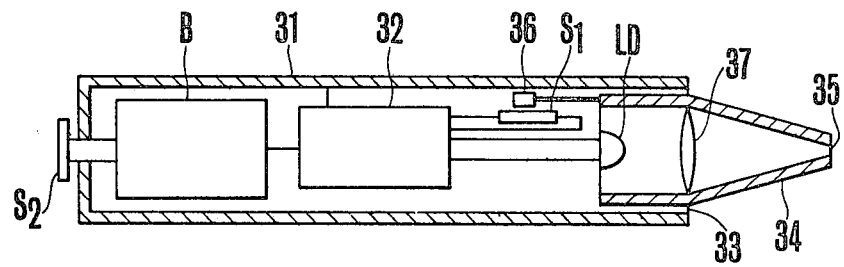
FIG. 3 is a longitudinal sectional view showing the construction of one example of a light pen.
Figure 4A:
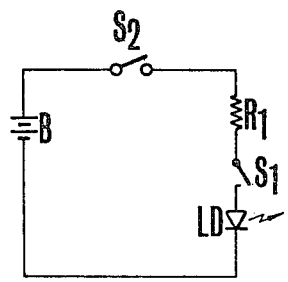
FIGS. 4A and 4B are connection diagrams of the circuits contained in the light pen.
Figure 4B:
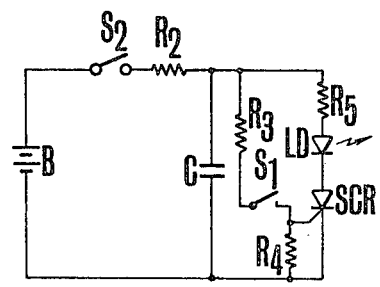

FIG. 3 shows the construction of the light pen 10 and FIGS. 4A and 4B show its electrical connection. The light pen comprises a cylindrical casing 31 made of metal or resin, a battery B, a circuit board 32, a reed switch $S_1$, and a light source which may be a light emitting diode LD which emits a large quantity of infrared rays, the above components being contained in the casing 31. A source switch $S_2$ is provided for one end of the casing, and a tapered or conical tip 34 is slidably received in the opening 33 at the other end. The tip 34 is normally biased to project by a spring not shown but it retracts into the casing when the light pen is urged against the surface of the optical guide channel so that a permanent magnet 36 secured to the inner end of the tip 34 actuates the reed switch $S_1$. A focussing lens 37 is contained in the tip 34 so that when the light emitting diode LD luminesces as the result of the operation of the reed switch $S_1$ caused by the retraction of the tip 34, the light is focussed to form a light beam which is projected through the tip.

FIG. 4A shows a circuit suitable for continuous luminescence for a pattern input. When reed switch $S_1$ is closed under the normal closure of source switch $S_2$, current $V/R_1$ flows through the light emitting diode LD to cause it to luminesce so long as the light pen is urged against the optical guide channel, where V represents the voltage of the source B and $R_1$ represents the resistance value of a series resistor $R_1$.

FIG. 4B is a circuit suitable for a symbol input. More particularly, when the source switch $S_2$ is closed, a capacitor C is charged through a resistor $R_2$, and when the reed switch $S_1$ is closed, the capacitor C discharges through resistors $R_3$ and $R_4$ whereby a trigger pulse is applied to a thyristor SCR. Accordingly, the light emitting diode LD is energized to flicker.

In the light pen connected as shown in FIG. 4B, the life of the battery B is elongated and the source switch $S_2$ may be omitted. Further, a microswitch may be substituted for the reed switch $S_1$ and the magnet 36. In certain cases, a discharge tube may be used as the light emitting element LD in which case the voltage of the battery is increased to charge the capacitor C, thus luminescing the discharge tube with the discharge current of the capacitor. If desired, an infrared ray filter may be used to project infrared rays. In this manner, the light pen can be modified variously.

Figure 5:
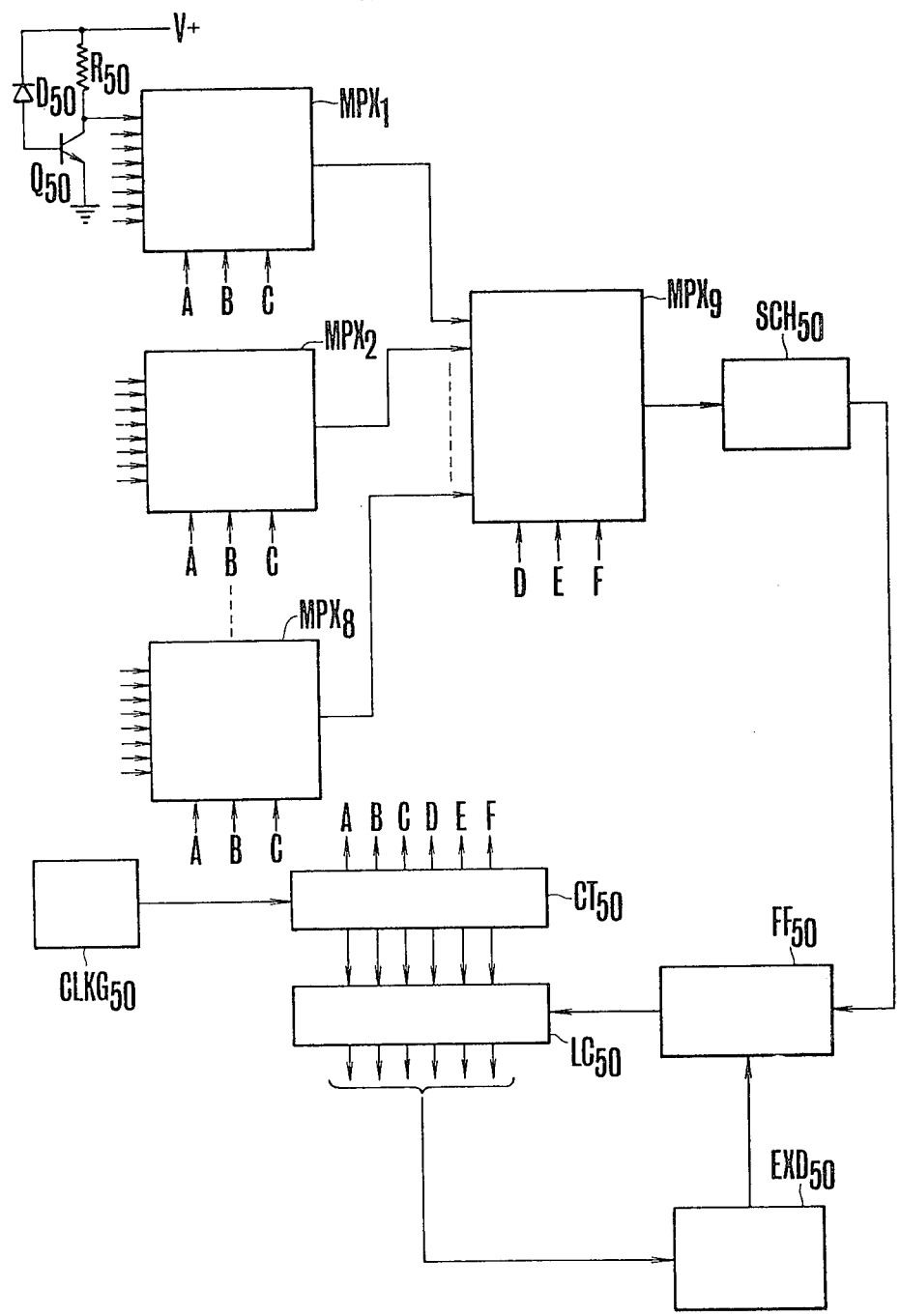
FIG. 5 is a block diagram of the electronic circuit shown in FIG. 1 in which the input board has 64 (=$2^6$) terminals.

FIG. 5 is a block diagram showing one example of the electronic circuit 101 shown in FIG. 1. The electronic circuit 101 operates to process electric signals from photo detectors 13 and 14 to derive out the coordinate position of a matrix point designated by the light pen 10 as a binary signal train. Although FIG. 1 shows an input board 100 comprising only four parallel lower optical guide channels 12, actually, a far larger number of the optical guide channels 11 and 12 are used. In FIG. 5, the electronic circuit is applied to an input board matrix comprising 64 ($=2^6$) optical guide channels 11 and 64 optical guide channels 12. Since the circuit associated with the optical guide channels 11 is identical to that associated with the optical guide channels 12, only the circuit associated with the optical guide channels 11 is shown. Furthermore, as 64 input signals are processed by identical circuits, only a circuit for the first input signal is shown.

As shown in FIG. 5, a photodiode $D_{50}$ is connected to the base electrode of a grounded emitter transistor $Q_{50}$, and the photodiode $D_{50}$ constitutes an input signal circuit together with a resistor $R_{50}$ connected between the collector electrode of transistor $Q_{50}$ and a source $V_+$. The photodiode $V_{50}$ corresponds to the photo detector 13 shown in FIG. 1 and senses a light signal from the optical guide channel 11. There are provided 8 multiplexers $MPX_1$ to $MPX_8$ each having 8 input terminals which are respectively connected to the output terminal of respective input signal circuits. Each one of the multiplexers $MPX_1$ to $MPX_8$ is provided with terminals connected to receive binary signal trains A, B and C from a binary counter $CT_{50}$. A multiplexer $MPX_9$ is provided with 8 input terminals respectively connected to 8 output terminals of the multiplexers $MPX_1$ to $MPX_8$ and three input terminals connected to receive binary signal trains D, E and F from the binary counter $CT_{50}$, and the output of the multiplexer $MPX_9$ is applied to a Schmitt circuit $SCH_{50}$. The output thereof is shaped by a flip-flop circuit $FF_{50}$ and its shaped output actuates a latch circuit $LC_{50}$ to send out, at the same time, the binary signal train. In a certain case, the flip-flop circuit $FF_{50}$ is used to transmit and receive the data of an external device $EXD_{50}$ and is reset when the external device receives a data. In another case, the flip-flop circuit is reset when the counter $CT_{50}$ is reset. A clock pulse from a clock pulse generator $CLKG_{50}$ is applied to the binary counter $CT_{50}$.

The electronic circuit described above operates as follows. Since the clock pulse generated by the clock pulse generator $CLKG_{50}$ is constantly applied to the counter $CT_{50}$ which in turn produces cyclically 64 binary signal trains which are designated by A, B, C, D, E and F. Of these $2^3$ ($=8$), binary signal trains A, B and C are applied to multiplexers $MPX_1$ to $MPX_8$ to successively and selectively close switch circuits in these multiplexers. The remaining $2^3$ ($=8$) binary signal trains D, E and F are applied to the multiplexer $MPX_9$ to successively and selectively close switch circuits in this multiplexer. It will thus be understood that 64 switch circuits are selectively closed by the combination of multiplexers $MPX_1$ to $MPX_8$ and the multiplexer $MPX_9$. This operation corresponds to the scanning of 64 matrix points on the input board 100. Since the period of the clock pulse is 1 to 10 $\mu$sec, the scanning is performed at a high speed so that as soon as a matrix point is designated by the light pen 10, the electric signal amplified by the input signal circuit passes through a selected switch circuit corresponding to a designated matrix point and then latches the latch circuit $LC_{50}$ through the Schmitt circuit $SCH_{50}$ and the flip-flop circuit $FF_{50}$. Accordingly, a binary signal train representing the coordinate position of that matrix point is sent out from the latch circuit $LC_{50}$. The Schmitt circuit $SCH_{50}$ determines a predetermined level of the signal so that an amplified signal corresponding to a signal produced by the light pen at any matrix point exceeds the predetermined level.

Figure 6:
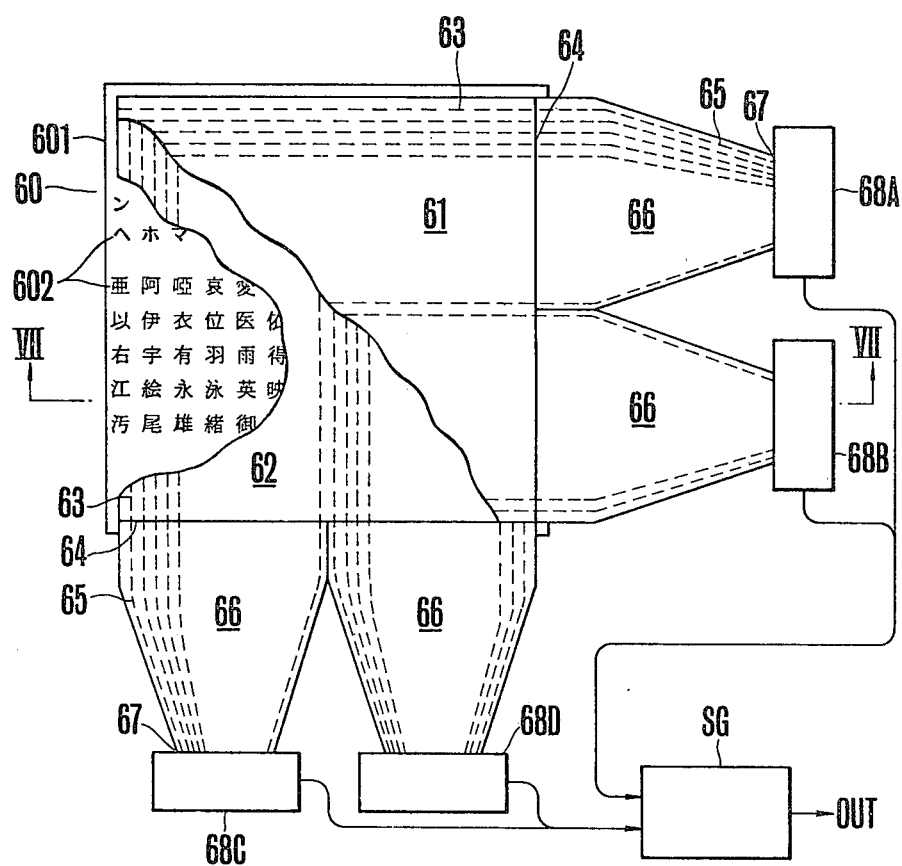
FIG. 6 is a plan view, partly broken away, of a modified embodiment of this invention.
Figure 7:
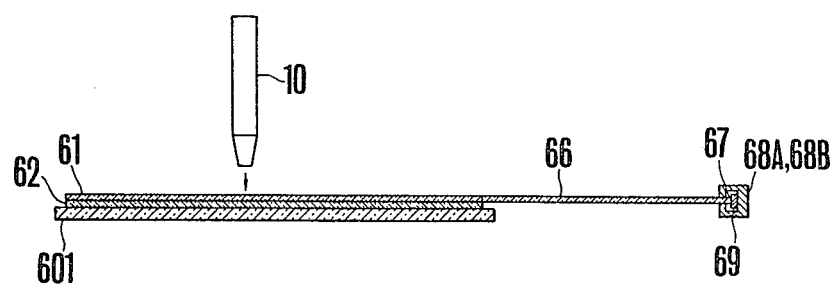
FIG. 7 is a sectional view taken along a line VII—VII shown in FIG. 6.

FIGS. 6 and 7 show another embodiment of this invention. In this embodiment, the pitch of the optical guide channels is decreased so that a plurality of parallel optical guide channels are arranged in one sheet so as to improve the resolution. An input board 60 comprises a first fiber optic sheet 61 and a second fiber optic sheet 62. Each of these fiber optic sheets includes a plurality of parallel optical guide channels 63 distributed over the entire surface thereof. These sheets are superposed one above the other with the optical guide channels 63 of the first and second sheets intersected at right angles. To optical guide ends of the fiber optic sheets 61 and 62 are closely connected tapered structure fiber optic sheets 66 each including a plurality of tapered optical guide channels 65 for the purpose of decreasing the spacing between the optical guide channels 63. Photo detector element arrays 68A to 68D are secured to the narrower ends 67 (where the spacings between the optical guide channels 65 are reduced) of the tapered structure fiber optic sheets 66 by a suitable bonding agent. As shown in FIG. 7, each photo detector element array comprises an array of photodiodes, for example.

When the tip of the input light pen 10 is urged against the surface of the first fiber optic sheet 61, a focussed beam of infrared ray is projected. The light beam projected onto the optical guide channels 63 of the first and second fiber optic sheets 61 and 62 is scattered by the minute scatterer in the optical guide channels 63 and the scattered light propagates through the optical guide channels 63 and through the optical guide channels 65 in the tapered structure fiber optic sheet 66 to reach either one of the photo detector element arrays 68A and 68B and either one of the photo detector element arrays 68C and 68D to be detected thereby. The detected outputs are applied to a signal generator SG to produce an electric signal corresponding to the coordinate position of the first and second fiber optic sheets 61 and 62 to which the light beam has been projected by the light pen 10. The output of the signal generator SG is sent to a data processing unit.

As shown in FIG. 7, a symbol table 601 is used when characters or symbols are used as the input. The symbol table 601 comprises a transparent sheet written with characters or symbols 602 with an ink not containing carbon, such as for example a methylene blue ink which is transparent to infrared rays. In FIG. 7, although the symbol table 601 makes intimate contact to the rear surface of the second fiber optic sheet 62, it may be in intimate contact with the rear surface of the first fiber optic sheet 61. In the former case, the symbols 602 may be written with a conventional ink.

Where patterns are used as the inputs, the symbol sheet 601 is omitted and an electronic display device utilizing a cathode ray tube, liquid crystals or electroluminescent substances is placed to oppose the rear surface of the second fiber optic sheet 62.

When the first and second fiber optic sheets 61 and 62 and the tapered structure fiber optic sheets 65 are prepared independently and then bonded together with their optical guide channels aligned with each other, it is possible to decrease the loss of light in the optical guide channels 65 of the tapered structure fiber optic sheet 66 because the optical guide channels 63 of the first and second fiber optic sheets 61 and 62 should contain minute scatterer whereas the optical guide channels of the tapered structure fiber optic sheets are not required to contain any scatterer. If desired, the first and second fiber optic sheets 61 and 62 and the tapered structure fiber optic sheet 66 may be formed as an integral unit.

Figure 8:
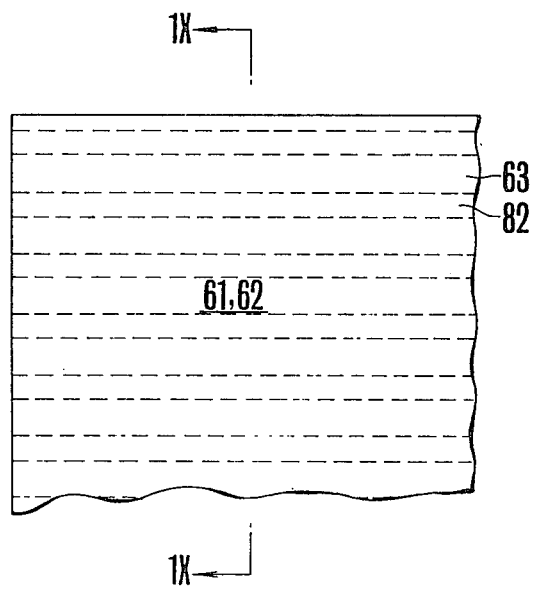
FIG. 8 is an enlarged plan view of a portion of the first and second fiber optic sheets.
Figure 9:
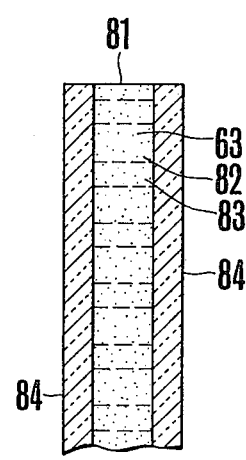
FIG. 9 is a sectional view taken along a line IX—IX shown in FIG. 8.

FIGS. 8 and 9 show the detail of the first and second fiber optic sheets 61 and 62. As shown, each sheet comprises cores 82 made of transparent sheets 81 incorporated with such a minute optical scatterer as a powder of silica and claddings 83 having different refractive index from the cores, the cores and claddings being arranged alternately. Protective layers 84 having smaller refractive index than the transparent sheets 81 are applied on both sides of the assembly to complete the optical guide channel 63.

One method of preparing the fiber optic sheets 61 and 62 will now be described.

More particularly, a polycarbonate $(D_6H_4C_6H_{10}C_6H_4OCOO)_n$ prepared from bisphenol Z (manufactured by Mitsubishi Gas Chemical Co.), methyl acrylate $(C_4H_6O_2)$, benzoin ethyl ether $(C_{16}H_{16}O_2)$ and a powder of silica having a diameter of 50 to 500 angstroms and acting as the minute optical scatterer are mixed together, and the mixture is dissolved in a solvent consisting of methylene chloride $(CH_2Cl_2)$. The solution is then poured into a horizontal tray and held standstill to evaporate only the methylene chloride to obtain a transparent sheet, preferred thickness thereof being about 20 to 200 μm. The density of the optical guide channels is about 1 to 10 channels/mm. One example of the dimensions of the optical guide channel includes: a length of 20 cm, a thickness of 100 μm, a pitch of the optical guide channels 100 μm.

A photomask is disposed on the transparent sheet thus obtained to irradiate the claddings 83 with ultraviolet rays so as to convert the claddings into polymethyl acrylate $(C_4H_6O_2)_n$ having a refractive index of about 1.58. The portions of the sheet not irradiated have a refractive index of about 1.59 and act as cores of the optical guide channel 63. Thereafter, polymethyl acrylate which has not participated in the reaction is removed by vacuum drying technique. Thereafter, an epoxy resin having a lower refractive index is applied onto the opposite surfaces of the transparent sheet to form protective layer 84 having a thickness of about 10 μm, thereby completing first or second fiber optic sheets 61 and 62.

The tapered structure fiber optic sheets 66 can also be manufactured by substantially the same method except that the optical scatterer such as silica powder is not involved. As will be described later, the configuration of the tapered structure fiber optic sheets is preferably such that the loss of the image at the joint between adjacent photo detectors is advantageously avoided.

Figure 10A:
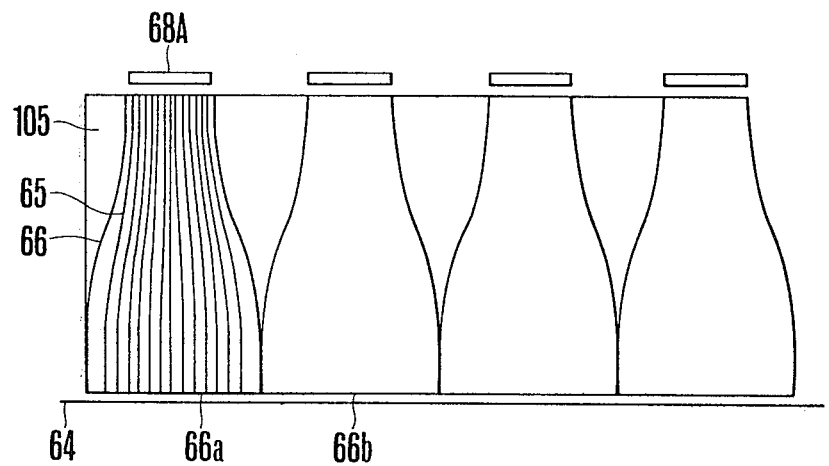
FIG. 10A is a diagrammatic plan view showing the construction of a tapered structure fiber optic sheet.

As shown in FIG. 10A, tapered structure fiber optic sheets 66 each having a wide end surface connected to the end surface or the image surface 64 of the fiber optic sheet 61 and a narrow width confronting a photo detector unit 68A are formed into a polymer fiber sheet 105. On one side of the sheet 105, opposing the image surface 64, the optical guide channels 65 are arranged parallelly at an equal spacing and then smoothly curved with a suitable radius of curvature (determined by the degree of reducing the size of the image), and finally arranged again in parallel at the opposite side confronting the photo detector unit 68A. The block width of one group of the optical guide channels is made equal to the width of the photo detector unit 68A. For these reasons, even when one end of the polymer fiber sheet 105 which confronts the image surface were ground exessively to make it flat, the optical guide channels at this side would still be maintained in parallel at an equal spacing and there is no loss of the image at the joint between adjacent blocks of optical guide channels on the side of image surface 64. Furthermore, even when the other end of the polymer fiber sheet 105 were excessively ground, the width of each optical guide channel block would be maintained the same as that of the photo detector unit 68A, thus preventing loss of the image at the joint between the photo detector unit 68A and the optical guide channels.

Figure 10B:
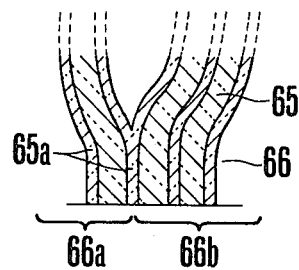
FIG. 10B is a partial sectional view showing the detail of one end of the fiber optic sheet shown in FIG. 10A.

FIG. 10B shows the detail of the optical guide channel 65 of the groups of tapered structure fiber optic sheets 66a and 66b at one end confronting the picture image surface. Thus, one cladding 65a is used in common for both the groups of tapered structure fiber optic sheets 66a and 66b. The commonly used cladding 65a extends inwardly, branching into two claddings having the same width. In this manner, as the optical guide channel 65 shifts continuously from the group 66a to the group 66b, there is no loss of the image at the joint between the two groups.

Figure 11:
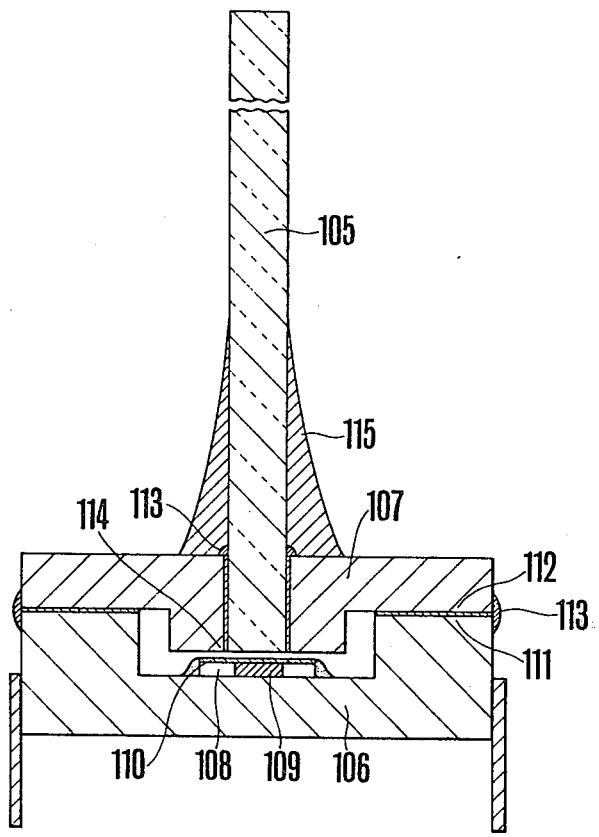
FIG. 11 is a sectional view showing a suitable optical coupling structure between the tapered structure fiber optic sheet and a photo detector array.

FIG. 11 shows the construction of a joint for optically coupling the tapered optical guide channels shown in FIGS. 10A and 10B to the photo detector element array. In FIG. 11, reference numeral 105 shows a fiber optic sheet, 106 a case of the photo detector, 107 a holder, 108 chips of a peripheral circuit, 109 a photo detector element array, 110 a transparent protective film, 111 the frame of the case, 112 the frame of a holder, 113 the film of a binder, 114 an aligned surface between the end of the fiber optic sheet and the surface of the central portion of the holder, and 115 a moisture-proof bonding resin.

The fiber optic sheet 105 such as made of polymer substance, as described above, contains a plurality of optical guide channels which are arranged in a row in a direction perpendicular to the surface of the sheet of drawing. Also, the photo detector is constituted by an array of a plurality of photo detector elements which are arranged in a direction perpendicular to the sheet of drawing, and the chips 108 of the peripheral circuit. The array 109 of the light receiving elements and the chips 108 of the peripheral circuit are contained in a vessel like case 106.

For the purpose of optically coupling the fiber sheet 105 with the photo detector element array 109 acting as the photo detector, the end of the fiber optic sheet 105 is received in the central portion of the holder 107 made of ceramics, metal or synthetic resin. While making the end of the sheet flush with the inner surface of the holder 107 on the surface 114, they are ground. Before this grinding operation, the sheet 105 is bonded to the holder 107 by a bonding agent 115. In this manner, since the sheet and the holder are ground as an integral unit, it is possible to finish the end surface of the flexible sheet to have an optical smoothness. Furthermore, it is possible to precisely adjust the distance between the photo detector element array 109 and the surface 114 by grinding. A thin and transparent protective film 110 made of a polymer substance, for example, is coated on the photo detector element array 109 and the chips 108 of the peripheral circuit, thus preventing the photo detector element array 109 and the chips 108 of the peripheral circuit from being damaged by direct contact with the surface 114. After treating the end surface of the fiber optic sheet and the light receiving portion of the photo detector in a manner as described above, the positions thereof are adjusted so that they can be optically coupled together. Then, the adjacent surfaces 112 and 111 of the holder 107 and the adaptor 106 are air tightly bonded together by a bonding agent 113. Since the moisture permeability of the polymer fiber optic sheet 105 is larger than that of ceramics and metal, there is a possibility that the moisture in the atmosphere may penetrate through the sheet and deteriorate the photo detector. For this reason, it is advantageous to apply moisture-proof bonding resin 115 onto the surface of the fiber optic sheet 105 to form an air tight seal. When the pitch of the optical guide channels is 56 μm, a preferred spacing between the aligned surface 114 and the array 109 is about 10 μm.

As described above, since the fiber optic sheet is mounted on the holder and the end surfaces of them are concurrently ground, the gap between the sheet and the photo detector can be easily made uniform. Moreover, as the end portion of the sheet is firmly held by the holder, its relative movement can be prevented. Furthermore, as the opposing surfaces of the holder and case are air tightly bonded together by a bonding agent, deterioration of the photo detector caused by the atmosphere can be prevented. The transparent protective film coated on the photo detector element array and the chips of the peripheral circuit protects the photo detector against moisture, thus improving the reliability thereof.

Figure 12:
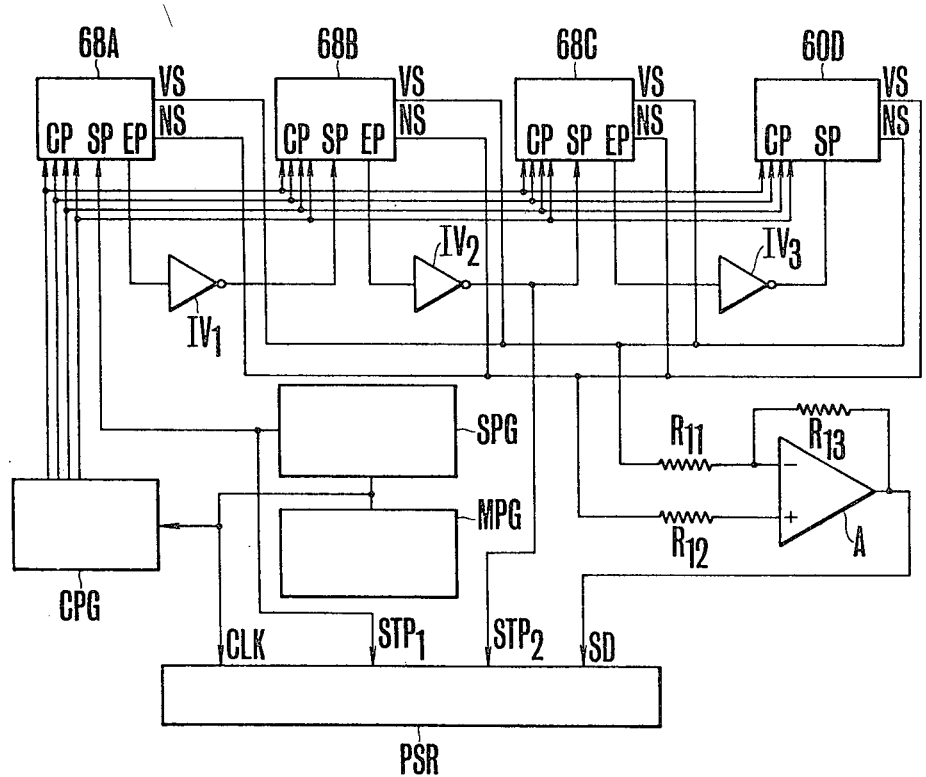
FIG. 12 is a block diagram showing one example of a signal generator utilized in the apparatus shown in FIG. 6.

FIG. 12 is a block diagram showing the construction of the signal generator SG shown in FIG. 6 wherein a photodiode array is used as the photo detector element arrays 68A to 68B, each comprising an array of small photodiodes for detecting incident light and a similar array in which the incident light is intercepted by an aluminum mask for detecting noise, dark current and clock noise. Each photo detector element array contains a shift register which sequentially sends amplified outputs to a signal terminal VS and a noise terminal NS and the array is driven by a four-phase clock pulse applied to its clock pulse terminal CP.

Like those shown in FIG. 6, the photo detector element arrays 68A and 68B generate an X axis detection output of the coordinate system formed by the optical guide channels 63 of the first and second fiber optic sheets 61 and 62. In the same manner, the photo detector element arrays 68C and 68D generate a Y axis detection output. The photo detector element arrays 68A to 68D are controlled to repeatedly and sequentially produce detected outputs.

More particularly, a master pulse generator MPG generates a master clock pulse CLK having a definite period which is applied to a start pulse generator SPG and the four-phase pulse generator CPG. Thus, in response to the master clock pulse CLK, the four-phase pulse generator CPG generates a four-phase clock pulse which is supplied to respective photo detector element arrays 68A to 68D. The start pulse generator SPG divides the frequency of the master clock pulse CLK by the repetition period to form a start pulse $STP_1$ which is supplied to the start terminal SP of the photo detector element array 68A.

Then, the shift register of the photo detector element array 68A starts to operate to sequentially apply the detected outputs of respective photo diodes to the signal terminal VS, and at the same time send corresponding noise output to the noise terminal NS, thus scanning the photodiode array. Upon termination of the scanning, the array 68A produces a termination signal on its termination terminal EP.

Since the termination signal is an inverted signal, it is inverted by an inverter $IV_1$ and then applied to the start terminal SP of the next photo detector element array 68B. Consequently, the scanning of the photodiode array is performed for the photo detector element array 68B to produce a detection output and a noise output.

In the same manner as described above, upon completion of the scanning operation of the photo detector element array 68B, a termination signal is applied to the start terminal SP of the third photo detector element array 68C via an inverter $IV_2$. In the same manner, photo detector element arrays 68C and 68D sequentially perform scanning operations to respectively produce detection outputs and noise outputs.

The detection outputs and the noise outputs produced by respective photo detector element arrays 68A to 68D are applied to an inverting input and a non-inverting input of a differential amplifier constituted by input resistors $R_{11}$ and $R_{12}$, a feedback resistor $R_{13}$ and an operational amplifier A. The differential amplifier produces a signal corresponding to the difference between the detected output and the noise output, and this difference signal is sent to a signal processing circuit PSR. Thus, by the action of the differential amplifier, the noise component in the detection output is cancelled by a noise output having similar waveform so that only the detection output is derived out as a comparative detection output SD.

Accordingly, as the light beam of the light pen 10 is projected upon any point of the coordinate system constituted by the first and second fiber optic sheets 61 and 62 shown in FIG. 6, comparative detection signals SD of the X and Y axes corresponding to a position of the coordinate formed by optical guide channels 63 are sucessively produced.

A start pulse $STP_1$ is generated by the start pulse generator SPG each time when the scanning operation of each photo detector element array completes so that this pulse is used as a reference and the time of generating the X and Y axis comparative detection signal SD corresponds to the coordinate position designated by the light pen 10.

Figure 13:
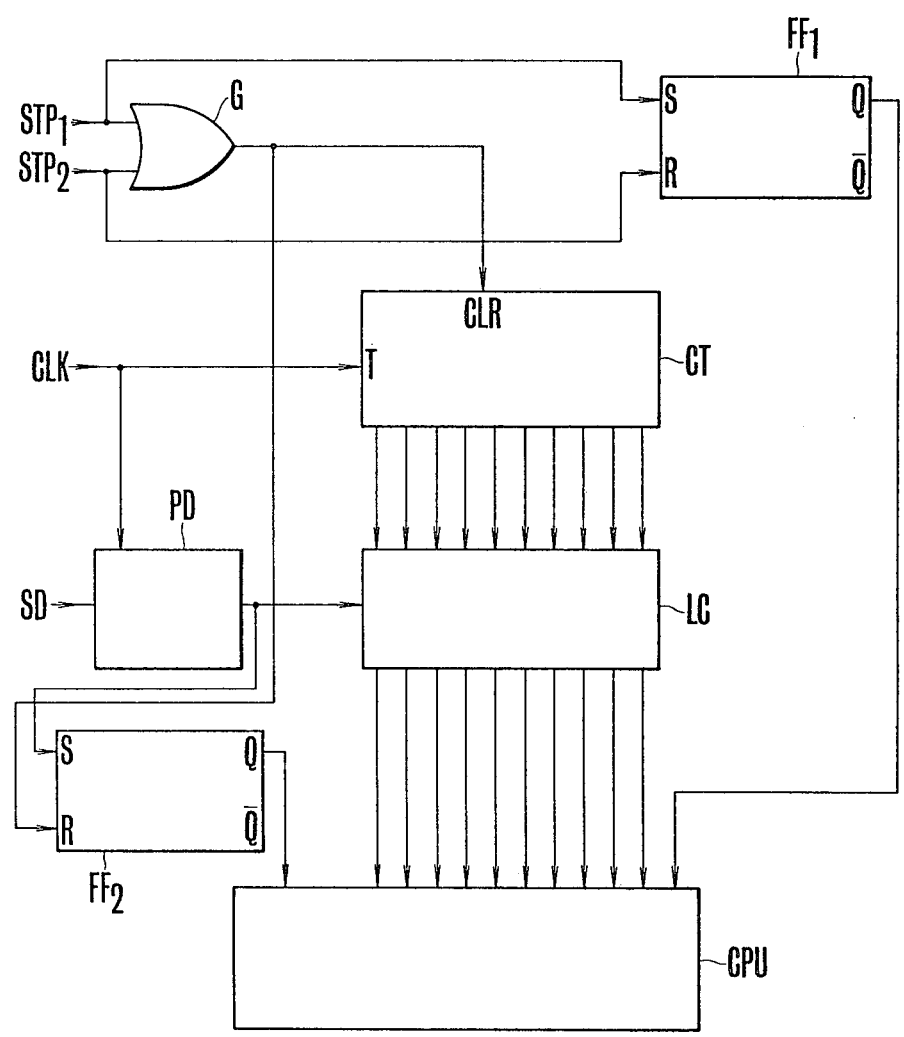
FIG. 13 is a block diagram showing a signal processing circuit utilized in the circuit shown in FIG. 12.

FIG. 13 is a block diagram showing the detail of the signal processing circuit PSR shown in FIG. 12 in which the signal applied to the start terminal SP of the photo detector element array 68C is also applied to act as a Y axis start pulse $STP_2$ in addition to the start pulse $STP_1$ produced by the start pulse generator, which start pulse $STP_1$ is used as an X axis start pulse.

These start pulses $STP_1$ and $STP_2$ are applied, through an OR gate circuit G, to the clear terminal CLK of a counter CT in the form of a binary counter, for example, to reset the same for starting the counting operation. The master clock pulse CLK is applied to the counter terminal T of counter CT so that the counter counts up each time the X and Y axis start pulses $STP_1$ and $STP_2$ are applied, to send out its count to a latch circuit LC comprising a register, for example.

A peak detector PD detects the peak value of a detection signal SD applied thereto and its output is applied to the latch circuit LC to cause it to hold the output of the counter CT. In other words, the latch circuit LC holds the output of the counter CT at a time when a comparative detection signal SD is generated in response to the light beam projected by the light pen 10.

In this manner, in response to the X and Y axis start pulses $STP_1$ and $STP_2$, the counter CT starts its counting operation and its count output is derived out by the X and Y axis comparative detection signal SD so that a position of the coordinate designated by the light pen is converted into the count of the counter for the X and Y axes. This output produces an electric signal corresponding to the position of the coordinate desgianted by the light beam projected by the light pen 10, and this signal is sent to the data processing system CPU from the latch circuit LC.

Since the latch circuit LC alternatively produces X axis and Y axis outputs, it is necessary to identify these outputs. For this reason, a flip-flop circuit $FF_1$ is set by the X axis start pulse $STP_1$ and reset by the Y axis start pulse $STP_2$ whereby an interval in which its Q output is produced represents an X axis signal whereas an interval in which the Q output is not produced represents a Y axis signal. This Q output is applied to the data processing system CPU.

Since the latch circuit LC constantly produces its output, it is necessary to designate a data receiving time for the data processing system. For this reason, a flip-flop circuit $FF_2$ is set by the output of the peak detector PD and reset by the output of the OR gate circuit G so as to apply the Q output during the set interval to the data processing system CPU to act as a data receiving instruction.

Figure 14:
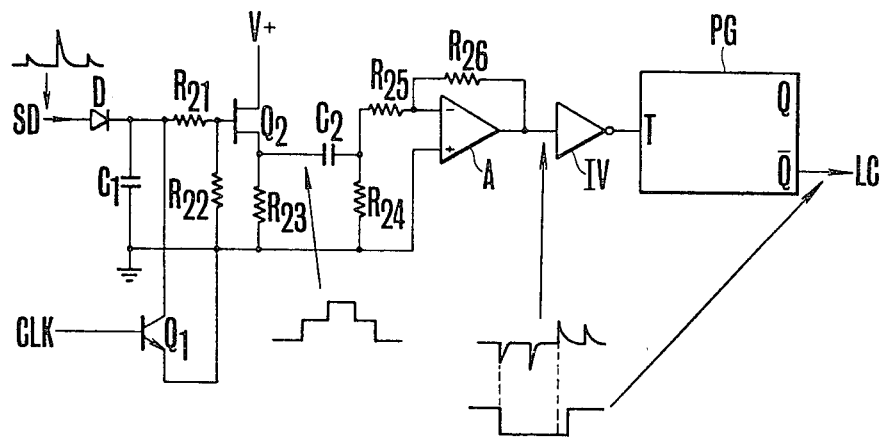
FIG. 14 is a connection diagram of the peak detector shown in FIG. 13.
Figure 15:
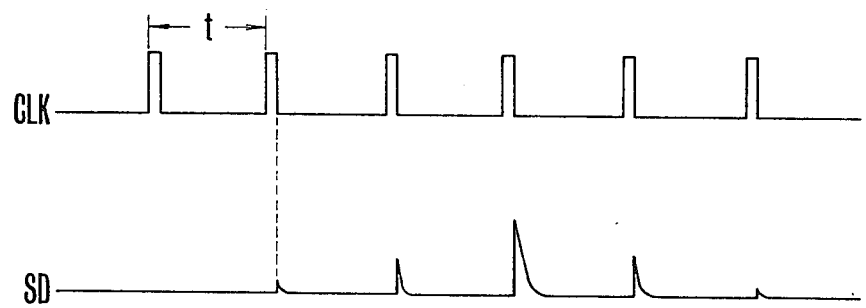
FIG. 15 is a time chart showing the relationship between a detected signal and a clock pulse.

FIG. 14 shows the detail of the peak detection circuit PD which is supplied with the comparative detection signal SD and the master clock pulse CLK at a timing shown in a time chart as shown in FIG. 15, so as to hold the peak value of the comparative detection signal SD applied through a diode D as the terminal voltage of a capacitor $C_1$. Immediately prior to the application of the next comparative detection signal SD, the master clock pulse CLK is applied to the base electrode of a transistor $Q_1$ to turn on the same. Thus, the capacitor $C_1$ discharges to prepare to hold the peak value of the next comparative detection signal SD.

The peak value of each detection signal held by the capacitor $C_1$ is amplified by a high input impedance amplifier constituted by resistors $R_{21}$, $R_{22}$ and $R_{23}$ and a field effect transistor $Q_2$ and then differentiated by a differentiating circuit constituted by a capacitor $C_2$ and a resistor $R_{24}$. The differentiated pulse is amplified and inverted by an amplifier constituted by resistors $R_{25}$ and $R_{26}$ and an operational amplifier A and the output of the amplifier is applied to the pulse generator PG in the form of a monostable multivibrator, for example, via an inverter IV.

Since the pulse generator PG is designed to generate a pulse having a width slightly wider than the period t of the master clock pulse CLK and the differentiated pulse is inverted twice by the operational amplifier A and the inverter IV, the pulse generator is driven by a positive-going differentiated pulse and continues to generate its output so long as the positive-going differentiated pulse persists.

Consequently, when a maximum peak value of the comparative detection signal appears, the output of the pulse generator PG extinguishes so that it is possible to detect the time of the peak value of the comparative detection signal SD by the trailing end of the output from the pulse generator PG.

In FIG. 14, since the rising of the output of the pulse generator PG is used as the peak detection signal, $\overline{Q}$ output of the pulse generator is used as the output thereof.

In accordance with this embodiment, $1 \times 15^{-5}$ part by weight of a fine powder of silica having a particle diameter of 10 angstroms was incorporated into a base material comprising a polycarbonate, and two fiber optic sheets were prepared from this polycarbonate material each having an optical guide channel pitch of 100 82 m, a length of 20 cm and a thickness of 100 μm. A silicon photo-diode array was coupled to each end surface of the sheets. An input light pen was used including a semiconductor laser producing light of 840 μm wave length and having an output of 10 mW. The laser beam was focussed on the input board by means of a lens. With this construction a S/N ratio higher than 20 dB was obtained at a storage time of 1 m sec, which was sufficient to determine the coordinate position of the light pen.

Figure 16:
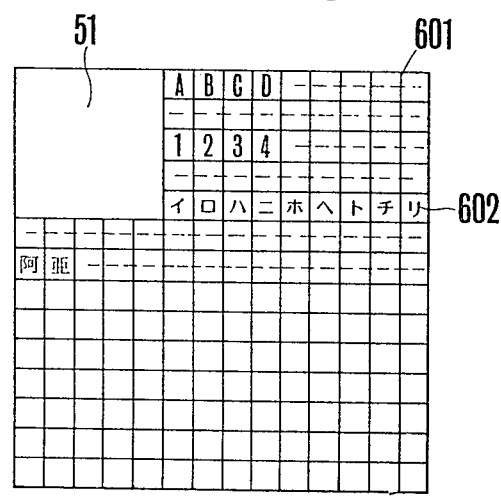
FIG. 16 is a plan view of a symbol table utilized in this invention.

FIG. 16 is a plan view showing a symbol table 601 adapted to be combined with the input board 60 as shown in FIGS. 6 and 7. Where the symbol table is placed on the surface of the first fiber optic sheet 61, symbols 602 are written on the surface of the table with an ink transparent to infrared rays except a blank 51. The portion written with the symbols 602 is used as a symbol input, whereas the surface of an electric display device is attached to the rear surface of the blank 51 to display a soft copy of patterns or symbols and to input the coordinate position of the soft copy.

Where the symbol table 601 is made of a transparent sheet, irrespective of the fact whether it is disposed on the front side or the rear side of the first or the second fiber optic sheet, it is necessary to write symbols on the symbol table except the blank 51. Whereas when the symbol table is made of an opaque sheet and disposed on the rear side of the second fiber optic sheet 62, the blank 51 may be cut away.

Since this invention, the light pen 10 emits infrared rays which can readily be discriminated from ordinary light so that high efficiencies can be obtained where photo detector element arrays 68A to 68D sensitive to infrared rays are used. However, it is possible to incorporate a pigment to a portion of the tapered structure fiber optic sheet 66 for utilizing this portion as an infrared ray filter. However, since in the signal generator SG, the peak value of the detected signal SD is detected by the peak detector PD, if there is a sufficient difference between the quantities of the ordinary light and the light beam projected by the light pen, detection could be made satisfactorily. It is possible to provide a source of light in the form of a fluorescent lamp, for example, on the back of the first and second fiber optic sheets 61 and 62 and the symbol table 601. Moreover, since the light pen 10 contains therein a battery B, no cord is needed and it is easy to handle. However, if desired, the light pen may be connected to an external source. The construction of the signal generator may be varied dependent upon the content of the electric signal generated thereby.

According to this modification, since the first and the second fiber optic sheets can be manufactured readily and moreover since the construction of the associated parts and peripheral circuit is simple, it is possible to obtain inexpensive and reliable input apparatus. Moreover, since the first and second fiber optic sheets are nearly transparent, it is possible to combine them with an electric display device. Accordingly, it is possible to use them not only as an input apparatus but also as a monitoring apparatus. Possibility of Exploitation in Industry Conventionally, in information processing systems systemitized around computer and communication circuit, rental fee for the computer has been costly and the system has been handled by "specialists", so that there has been no great demand for inexpensive and easy-to-operate terminal apparatus. Recently, however, microprocessors and various memories can be manufactured at low cost, leading to inexpensive central processor units, and various terminal apparatus grow to occupy a relatively large part in price. Accordingly, it is desired to provide an inexpensive, easy-to-operate and multifunctional terminal apparatus. The present invention provides, as such a terminal apparatus, an inexpensive coordinate input apparatus which can be supplied with an input in the form of character data and hand-written patterns as well and which can be operated with a cordless input pen.

We claim:

1. A coordinate input apparatus comrising an input board (100) including two optical guide arrays superposed one upon the other with the optical guide channels of one array intersected at right angles with the optical guide channels of the other array, each array having a plurality of paralelly disposed optical guide channels (11, 12), each channel containing an optical scatterer (22); a light pen (10) adapted to project a light beam upon said input board; photo detector (13, 14) disposed to oppose one end surface (11a, 12a) of said respective optical guide channels for detecting scattered light of said projected light beam and propagating through said optical guide channels to convert the detected light into electrical signals; and an electronic circuit (101) responsive to said electrical signals for producing a binary signal train which determines a coordinate position where said light beam is projected by said light pen.

2. A coordinate input apparatus according to claim 1 wherein each optical guide channel comprises a core (16) containing said optical scatterer and a protective layer (17) having low refractive index and provided about said core.

3. A coordinate input apparatus according to claim 2 wherein said core comprises a base material of a polystyrene incorporated with $10^{-5}$–$10^{-3}$ part by weight of a fine powder of silica having a particle size of several tens of angstroms, and wherein said protective layer comprises a polymer substance having lower refractive index than said core.

4. A coordinate input apparatus according to claim 1 wherein said light pen contains therein a source of power (B).

5. A coordinate input apparatus comprising a first fiber optic sheet (61) including a plurality of parallelly disposed straight optical guide channels (63), each containing a minute optical scatterer; a second fiber optic sheet (62) having the same construction as said first fiber optic sheet and superposed thereon with the optical guide channels of the first and second sheets intersected; tapered structure fiber optic sheets (66) disposed at the end surface (64) of said first and second fiber optic sheets, each tapered structure fiber optic sheet including tapered optical guide channels with a reduced spacing therebetween; photo detector element arrays (68A, 68B, 68C, 68D) each including a plurality of photo detector elements disposed to oppose said optical guide channels having reduced spacing of said tapered structure fiber optic sheets; a light pen (10) for projecting a focussed light beam onto the optical guide channels of said first and second fiber optic sheets; and a signal generator (SG) responsive to the outputs of said photo detector element arrays for producing an electrical signal corresponding to a coordinate position on which said light beam is projected from said light pen.

6. A coordinate input apparatus according to claim 5 wherein the density of arrangement of said optical guide channels of said first and second fiber optic sheets is 1 to 10 channels per mm.

7. A coordinate input apparatus according to claim 5 wherein each of said first and second fiber optic sheets comprises cores and claddings which are arranged alternately, and protective layers on both sides of the sheet, said protective layers acting also as claddings.

8. A coordinate input apparatus according to claim 7 wherein said core comprises a base material of a polycarbonate incorporated with $10^{-5}$ to $10^{-3}$ part by weight of a fine powder of silica having a particle size of several tens of angstroms, and wherein said protective film comprises a polymer substance having lower refractive index than said core.

9. A coordinate input apparatus according to claim 5 wherein the optical guide channels of said tapered structure fiber optic sheet are parallel with each other at both ends of said sheet.

10. A coordinate input apparatus according to claim 5 wherein one end of said tapered structure fiber optic sheet is supported by a holder, said one end and the surface of said holder are flush on a common surface, and each photo detector element array is supported by a case such that said array opposes the ends of said optical guide channels at said common surface, said case defining an air tight chamber together with said holder.

11. A coordinate input apparatus according to claim 10 which further comprises a transparent protective layer interposed between said photo detector element array and said common surface.

12. A coordinate input apparatus according to claim 5 wherein said photo detector element comprises an incident light detection array and a noise detection array, and wherein said signal generator comprises means for causing said incident light detection array and said noise detection array to cyclically send out incident light detection signals and noise signals in a time series, means for comparing said incident light detection signal and said noise signal for producing a comparative detection signal, means for generating a first start signal which determines a first starting point in one cycle corresponding to a first optical guide channel of said first fiber optic sheet, means for generating a second start signal which determines a second start point in one cycle corresponding to a first optical guide channel of said second fiber optic sheet, and a signal processing circuit for processing said comparative detection signal, said first start signal and said second start signal to determine a coordinate position which receives the light beam from said light pen.

13. A coordinate input apparatus according to claim 12 wherein said signal processing circuit comprises a counter which counts the position of said optical guide channel measured from said first and second starting points, a latch circuit applied with an output of said counter, a peak detector for detecting a peak value of said comparative detection signal thereby latching said latch circuit in response to said detected peak value, and a data processing system responsive to a signal which identifies said first and second start points and to the output of said peak detector for receiving the output of said latch circuit thereby determining a coordinate position upon which said light beam is projected from said light pen.

14. A coordinate input apparatus according to claim 13 wherein said peak detector comprises a circuit for holding a peak value of said comparative detection signal, a high impedance amplifier responsive to said peak value held by said circuit for producing an amplified output having the same polarity as said peak value, a differentiating circuit for differentiating the output of said high impedance amplifier, an operational amplifier which inverts and amplifies the output of said differentiating circuit, and a pulse generator driven by an inverted output of said operational amplifier to form a signal representing a time at which said comparative detection signal is produced.

15. A coordinate input apparatus according to claim 5 which further comprises an electronic display device which is disposed on the rear side of said first and second fiber optic sheets with the display surface of said display device faced to said sheets.

16. A coordinate input apparatus according to claim 5 which further comprises a symbol table made of a transparent sheet disposed closely adjacent said first and second fiber optic sheets and written with symbols with an ink transparent to infrared rays.

17. A coordinate input apparatus according to claim 5 which further comprises a symbol table made of a transparent sheet disposed closely adjacent said first and second fiber optic sheets, said table including a blank portion and a portion written with symbols with an ink transparent to infrared rays and an electronic display device which is disposed on the rear side of the said first and second fiber optic sheets with the display surface of said display device faced to said first and second fiber optic sheets.

* * * * *

UNITED STATES PATENT AND TRADEMARK OFFICE
CERTIFICATE OF CORRECTION

PATENT NO. : 4,320,292
DATED : March 16, 1982
INVENTOR(S) : Shigeru Oikawa; Yuzo Katayama; et al It is certified that error appears in the above—identified patent and that said Letters Patent is hereby corrected as shown below:

Column 4, line 49, after the equation add -- (3) --.

Column 5, line 67, "scatterer" should be -- scattered --.

Column 13, line 42, "alternatively" should be --alternately --.

Column 14, line 18, after "driven" insert -- only --.

Column 14, line 32, "1 x 15$^{-5}$" should be -- 1 x 16$^{-5}$ --.

Column 14, line 38, "100 82m" should be -- 100 $\mu$m --.

In the Claims:

Column 15, line 51, Claim 1, "comrising" should be -- comprising --.

Column 16, line 24, Claim 5, "surface" should be -- surfaces --.

Column 18, line 32, Claim 17, delete "the" after -- side of --.

Signed and Sealed this

Third Day of August 1982

[SEAL]

Attest:

GERALD J. MOSSINGHOFF

Attesting Officer  Commissioner of Patents and Trademarks